United States Patent
Cavallaro (10) Patent No.: US 9,429,485 B1
(45) Date of Patent: Aug. 30, 2016

(54) BOLT SHEAR FORCE SENSOR

(71) Applicant: Paul V. Cavallaro, Raynham, MA (US)

(72) Inventor: Paul V. Cavallaro, Raynham, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/645,516

(22) Filed: Mar. 12, 2015

(51) Int. Cl.
*G01L 1/00* (2006.01)
*G01L 1/04* (2006.01)
*G01L 1/16* (2006.01)
*G01L 5/24* (2006.01)

(52) U.S. Cl.
CPC . *G01L 1/04* (2013.01); *G01L 1/16* (2013.01); *G01L 5/24* (2013.01)

(58) Field of Classification Search
CPC ..... G01L 5/24; G01L 1/2212; G01L 1/2218; G01L 1/2231; G01L 1/2237
See application file for complete search history.

(56) References Cited

U.S. PATENT DOCUMENTS

| | | | | |
|---|---|---|---|---|
| 2,493,029 A * | 1/1950 | Ramberg | G01L 1/2212 | 177/211 |
| 4,094,192 A * | 6/1978 | Watson | G01L 25/00 | 338/2 |
| 4,182,189 A * | 1/1980 | Dock | B23K 20/085 | 116/DIG. 34 |
| 4,478,091 A * | 10/1984 | Forrester | B60G 11/12 | 177/136 |
| 4,553,124 A * | 11/1985 | Malicki | F16B 31/025 | 338/2 |
| 4,630,490 A * | 12/1986 | Malicki | G01L 1/22 | 338/5 |
| 4,823,618 A * | 4/1989 | Ramming | G01L 5/161 | 73/862.044 |
| 4,911,024 A * | 3/1990 | McMaster | G01L 5/161 | 73/862.044 |
| 4,932,253 A * | 6/1990 | McCoy | E21B 47/0006 | 73/152.61 |
| 4,957,002 A * | 9/1990 | Coyle, Jr. | B23P 19/066 | 73/761 |
| 5,063,788 A * | 11/1991 | Ch'Hayder | G01L 5/161 | 73/862.043 |
| 5,437,525 A * | 8/1995 | Bras | G01L 5/24 | 116/212 |
| 5,490,427 A * | 2/1996 | Yee | G01L 5/161 | 73/767 |
| 5,783,751 A * | 7/1998 | Maw | G01L 5/0004 | 73/761 |
| 5,945,665 A * | 8/1999 | Hay | G01B 11/18 | 250/227.14 |
| 6,250,863 B1 * | 6/2001 | Kamentser | F16B 31/028 | 116/212 |
| 6,378,384 B1 * | 4/2002 | Atkinson | G01L 1/2231 | 73/862.474 |
| 6,679,100 B2 * | 1/2004 | Kiess | G01L 23/22 | 73/114.19 |

(Continued)

*Primary Examiner* — Lisa Caputo
*Assistant Examiner* — Tran M Tran
(74) *Attorney, Agent, or Firm* — James M. Kasischke; Michael P. Stanley (57) ABSTRACT

A bolt shear force sensor for in-service monitoring is provided in which the sensor includes a deformable ring with channel-like cross-sections and a wire egress hole. The ring surrounds a bolt or fastener to be tested. The channel-like cross sections face exterior to a center of the ring. Strain sensing elements are mounted within the channel cross-sections as an outer circumference of the ring. The sensing elements capture hoop strain from surrounding plates of the operating system which holds the fastener. A signal conditioner operationally connected via wire conductors is used to convert strain sensing signals from the sensing elements to strain output. The strain outputs are then used in conjunction with a calibration curve of shear force versus strain to determine the magnitudes and directions of the resultant shear forces.

3 Claims, 13 Drawing Sheets

(56) References Cited

U.S. PATENT DOCUMENTS

| | | |
|---|---|---|
| 6,766,697 B1 | 7/2004 | Perez |
| 6,768,065 B2 * | 7/2004 | Bertenburg ............ B60N 2/002 177/144 |
| 6,792,815 B2 * | 9/2004 | McDearmon ........... G01L 5/161 73/862.041 |
| 6,868,737 B2 * | 3/2005 | Croteau ................. G01D 5/268 73/800 |
| 7,260,997 B2 * | 8/2007 | Luethje .................... G01L 5/24 73/761 |
| 7,289,033 B2 * | 10/2007 | Hockersmith ........... A61B 6/56 340/539.12 |
| 7,350,426 B2 * | 4/2008 | Blakesley ............... B60R 22/18 73/862.391 |
| 7,628,079 B2 * | 12/2009 | Sato ......................... G01L 5/24 73/761 |
| 7,819,017 B2 * | 10/2010 | Munz .................... G01L 1/2237 73/761 |
| 8,391,561 B2 * | 3/2013 | Takman .................. F16B 31/02 29/407.01 |
| 8,583,383 B2 * | 11/2013 | Imai ......................... G01L 5/24 702/43 |
| 8,695,432 B2 * | 4/2014 | Hsieh .................... F16B 31/025 411/383 |
| 8,893,557 B2 * | 11/2014 | Mekid .................. G01L 5/0038 73/761 |
| 8,931,368 B2 * | 1/2015 | Fujiwara ............... G01L 1/2237 74/512 |
| 9,114,681 B2 * | 8/2015 | Brun |
| RE45,883 E * | 2/2016 | Ohbayashi |
| 2008/0267692 A1 * | 10/2008 | Soderlund ............. B23B 31/204 403/5 |
| 2009/0210173 A1 | 8/2009 | Arms |

* cited by examiner

BOLT SHEAR FORCE SENSOR

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention relates to a bolt shear force sensor for use in design testing as well as in-service monitoring in order to provide a structural assessment of a bolt or fastener while attached in an operating system.

(2) Description of the Prior Art

The design of submarine and ship systems required to survive the effects of mechanical shock must consider not only the system and foundation to which the system is attached but also the mechanical fasteners connecting them. While it is well known that structures typically fail at mechanical joints and other discontinuities; there are significant difficulties in assessing and predicting localized distribution of forces within the mechanical fasteners used at the joints.

These difficulties increase when loading forces are dynamic as in the case of shock, blast, vibration and seismic events. As such, making a determination of proper sizing, spacing, pre-tensioning and quality of fasteners becomes increasingly critical. Therefore, achieving the required level of structural integrity in mechanically fastened joints has further implications on the design methods used and the need for experimental testing.

In commercial applications, qualification by analysis is becoming more prevalent; especially when providing design guidance and establishing performance criteria. Since the need remains to understand how mechanically-fastened joints behave; a need also exists to identify individual fastener behavior from structural tests and to improve the knowledge base and design methods for joints in load-carrying structures.

Multiple devices and methods for measuring axial forces in fasteners are described in the art. However, these devices and methods do not adequately measure fastener shear forces in which those forces transversely align with a longitudinal axis of a bolt. In a properly designed joint, axial and shear forces must be considered because of their cumulative effect on fastener stress.

While handbook calculations and numerical methods are typically employed for estimation purposes; both types of methods require kinematic and constitutive (stiffness) assumptions in regard to the transfer of external loads and the resulting distribution of internal reaction forces among participating joint components. In mechanically fastened joints subjected to shearing loads; factors (such as elasticity of the joined members, hole tolerances, interfacial friction, creep, thermal expansion, etc) affect the ability of the joint to resist shearing motions among joined members.

While fastener shear forces directly create shear stresses; the forces also create a secondary effect that generates fastener bending stresses. These bending stresses, which are difficult to quantify because the bending moment arm in each fastener is often unknown, superimpose with pretension stresses. As such, it is apparent that for joints subject to shearing loads; fastener tensions stresses comprise the direct axial tension (the sum of initial pretension and externally applied axial joint loads) and the bending stress due to shearing forces.

In the known art, Slack (U.S. Pat. No. 4,870,866) describes an ultrasonic method for measuring contact pressures on mating interfaces of solids undergoing compression. In the reference, an interfacial region contains an entrapped film of liquid. By monitoring the change in acoustic pulses; the contact pressure can be determined. However, to determine the shear force, additional processing would require an integration of the contact pressure over the contact area. Hence, to obtain the shear force; the contact area must also be monitored. This method would be difficult to employ with existing in-service monitoring applications.

Figure 1:
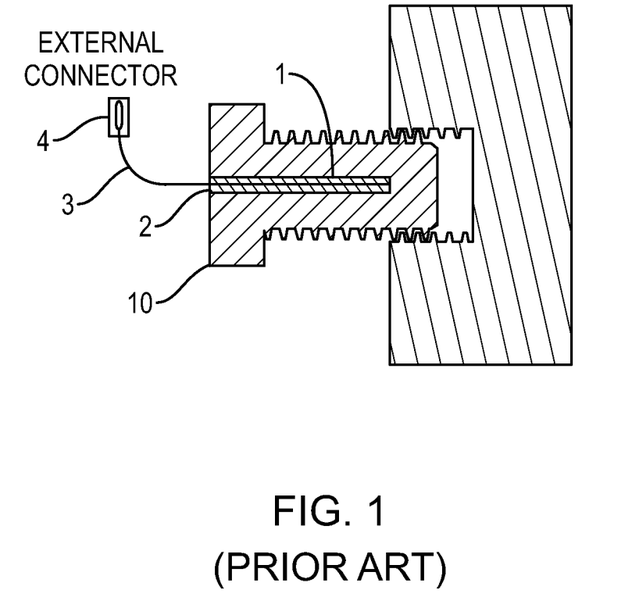
FIG. 1 depicts a prior art axial bolt force sensor having fiber optic Bragg strain gages.

Hay (U.S. Pat. No. 5,945,665) describes a fiber optic strain gage-based transducer which measures only the axial force (including pretension) in the bolt (See FIG. 1). In the figure, a Bragg grating sensor 1 is inserted and held by epoxy 2 in a mechanical fastener 10. Optical fiber 3 connects the grating sensor 1 to an external connector 4. Other devices use washers instrumented with wire (foil) strain gages in which the gages only measure the axial forces in bolts.

In other commercially-available measurement devices, pressure sensitive films are mounted between the fasteners. The bearing surface of the mating holes for the fasteners can be used to measure shear forces from patterns of contact pressures. These films contain microcapsules that release color at prescribed pressure ranges. A scanning device is then used to measure the variations in color intensity of the contact pressure pattern. However, the films do not allow continuous, real-time monitoring of forces. Disassembly of the joint is required to quantify the magnitudes of the shear forces.

Also in the prior art, Shah (U.S. Pat. No. 8,433,160) includes optical sensing elements positioned through a continuous aperture collinearly with a longitudinal axis of a fastener in order to sense strain and temperature. The sensing elements sense localized fastener deformations that occur along the longitudinal axis. The fiber optic sensing elements can be used to capture axial, transverse and torsional strains as measured from the localized deformations of the drilled hole region of the fastener. However, the Shah reference cannot distinguish directly between transverse compression strains due to Poisson's effect and bolt bearing strains.

Figure 2:
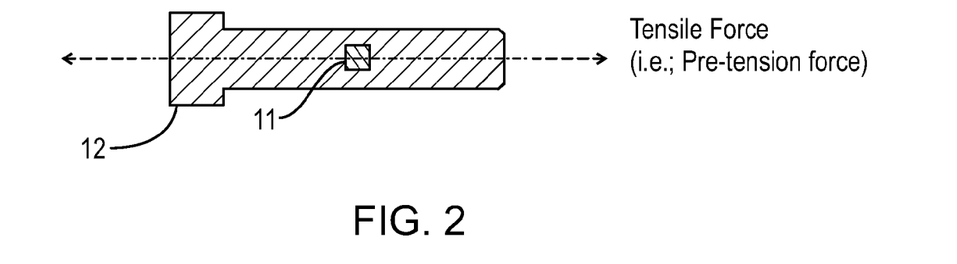
FIG. 2 depicts a fastener loaded in axial tension.
Figure 3:
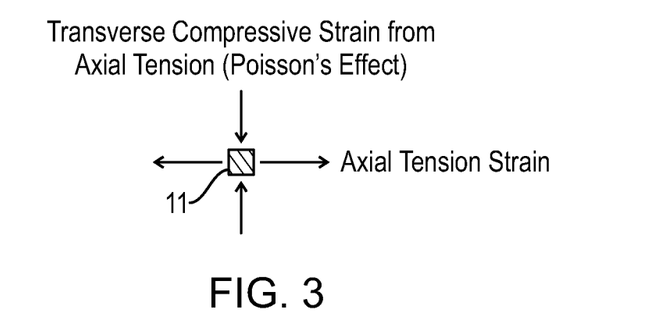
FIG. 3 depicts a material element of a fastener with transverse compressive strain and axial strain.

Using FIG. 2, consider an element of material 11 of a fastener 12 loaded in pure axial tension. By Poisson's effect, a compressive strain would develop along an axis orthogonally transverse to the longitudinal axis of the fastener (See FIG. 3). The Shah reference senses this transverse strain which is not a result of any bolt bearing induced strains.

Figure 4:
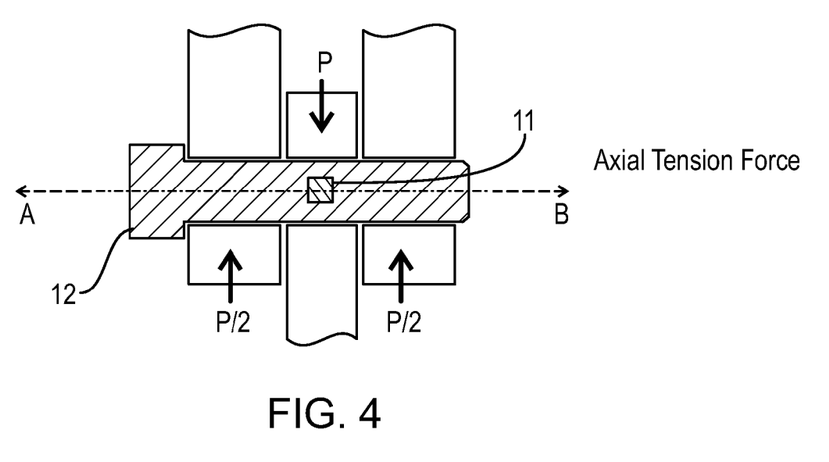
FIG. 4 depicts a fastener under axial tensile and double shearing forces.
Figure 5:
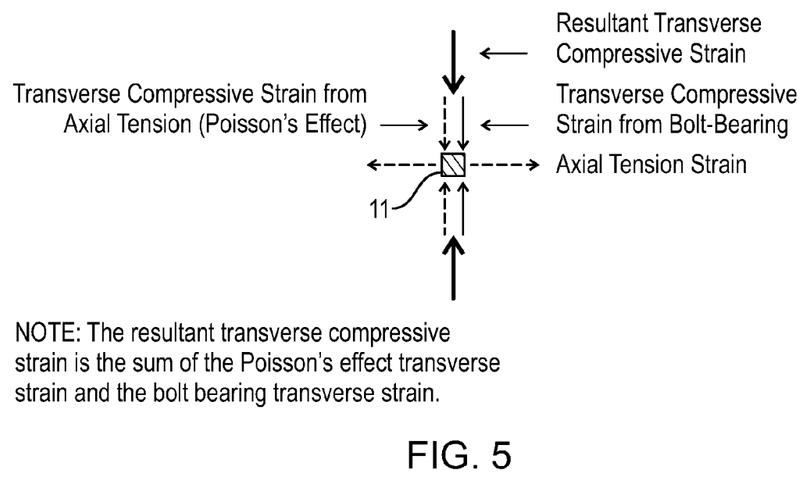
FIG. 5 depicts a material element of a fastener subjected to multiple strains.

Using FIG. 4, now consider the combined presence of Poisson's strains from bolt tension and transverse strains of a bolt bearing. For example in the figure, the fastener 12 with the identified element 11 is loaded in double shear by forces "P" and "P/2" with the fastener also under axial tensile force as indicated by direction arrows A and B. In FIG. 5, the identified element 11 is under compressive and axial strain.

These transverse strains are sensed rather than the individual transverse strain components. With the use of signal processing, the Poisson's effect transverse strains (i.e., the transverse compressive strains resulting from axial tensile loads in the fastener) must be separated from the transverse bolt bearing strains. This is an indirect approach.

Based on the existing art, a need still exists for a bolt shear force sensor for design validation testing as well as in-service monitoring for structural health assessment. The sensor should be available for use in both static and dynamic applications.

SUMMARY OF THE INVENTION

It is therefore a general purpose and primary object of the present invention to provide a bolt shear force sensor for use in design validation as well as in-service monitoring.

In order to attain the object described, the present invention includes a bolt shear force sensor having a deformable ring with channel-like cross-sections as a circumference and a wire egress extending thru one of the flanges (arms) of the channel. Strain sensing elements are mounted to an outer face of the circumference in a central area (mid-section) of the channel region. The deformable ring surrounds a bolt or mechanical fastener positioned or attached in an operating system.

Once the bolt is subjected to an external load from the surrounding system; any frictional resistance to slip is overcome to the extent that a bolt bearing develops within the system. The bolt then is locked in position and resists further motion. Also at this time, the bolt compresses the sensors or strain gages of the surrounding deformable ring and the ring deforms.

The strain sensing elements of the deformable ring capture hoop strain and then produce signals based on the strain. A signal conditioner accepts the signals from the strain sensing elements via wire conductors or optical fibers. The signal conditioner calculates and converts the strain sensing signals to strain output. The strain outputs are then used in conjunction with a calibration curve of shear force versus strain to determine the magnitudes and directions of the resultant shear forces.

The present invention provides a device capable of continuous and real-time monitoring of shear forces in fasteners used in mechanical joints. The sensor can be used in both static and dynamic applications. The bolt shear sensor is particularly useful in joints containing multiple fasteners in which the distribution of fastener shear forces may be complicated or difficult to determine.

BRIEF DESCRIPTION OF THE DRAWINGS

Other objects, features and advantages of the present invention will become apparent upon reference to the following description of the preferred embodiments and to the drawing, wherein.

DETAILED DESCRIPTION OF THE INVENTION

Figure 6:
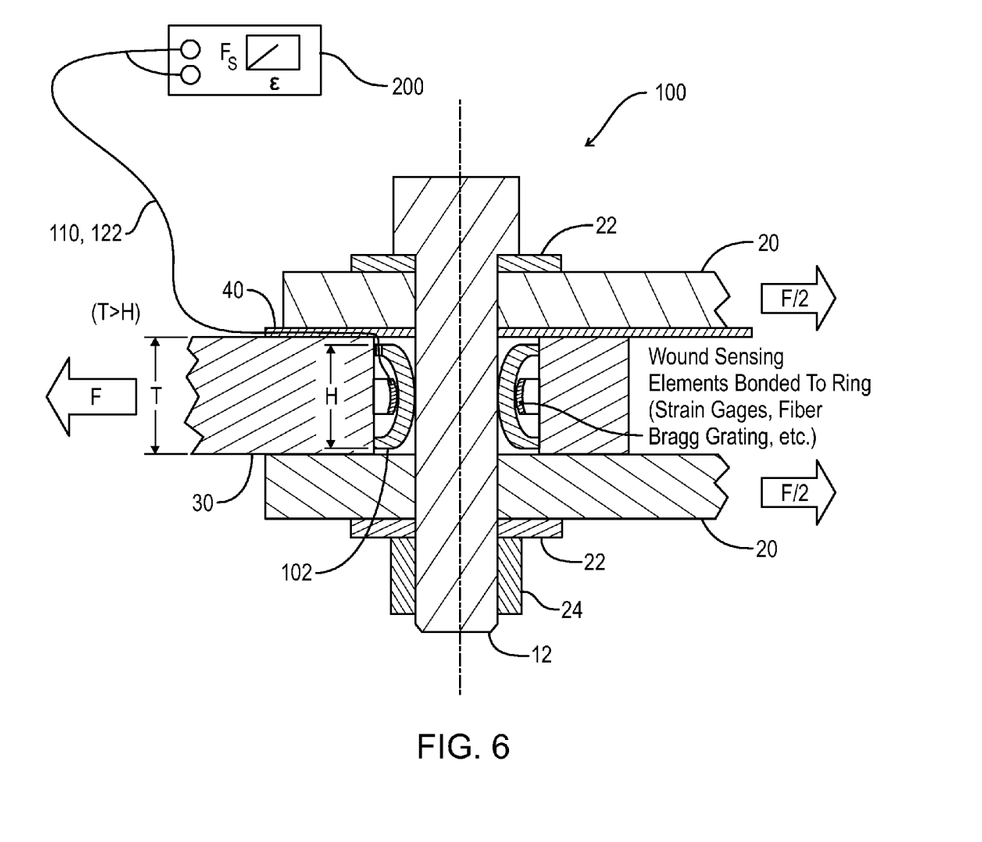
FIG. 6 depicts a cross-section view of a bolt shear force sensor of the present invention with a bolted joint under double shear stress with the sensor operationally connected to a signal conditioner.

As depicted in FIG. 6, the present invention provides a bolt shear force sensor 100 having a nearly-rigid, yet deformable ring 102 with indented channel-like cross-sections. In the figure, a bolt 12 is positioned between plates 20 and secured with washers 22 and a nut 24. Forces acting on the bolt 12 and the deformable ring 102 are depicted by direction arrows "F" and "F/2".

Figure 7:
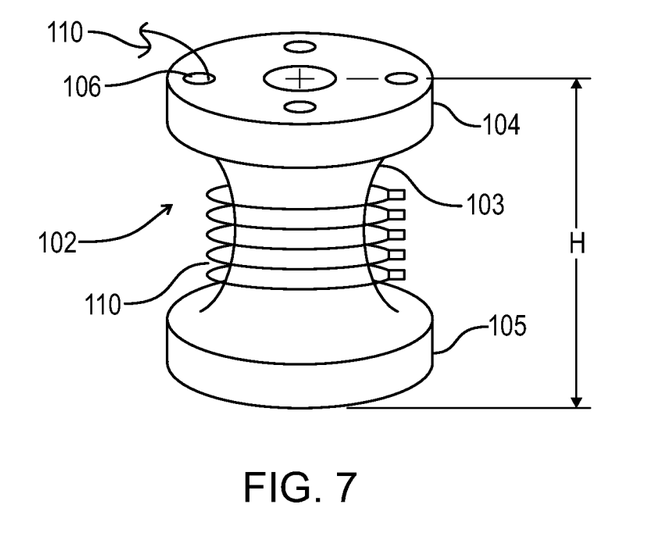
FIG. 7 is an isometric view of a deformable ring of the bolt shear force sensor of the present invention with an optical fiber having Bragg gratings wound around the ring.

As shown in the detail view of FIG. 7, the deformable ring 102 is a shear force sensor ring employing an optical fiber 110. The optical fiber 110 is continuously wound around and glues (fastened) to a vertical section 103 positioned between an upper flange 104 and a lower flange 105 of the ring 102. The optical fiber 110 includes Bragg gratings which are commonly used as measuring sensors.

The deformable ring 102 includes at least one egress hole or aperture 106 which provides a conduit for the optical fiber 110 to connect to a signal conditioner 200 (See FIG. 6). The deformable ring 102 may be constructed from conventional materials (metal, composite, plastic etc.) or with piezoelectric ceramics. If the ring 102 is constructed with piezoelectric ceramics, the ring itself is the sensor; therefore, there is not a need for the optical fiber 110 or any other measuring sensor wound around the ring.

Figure 8:
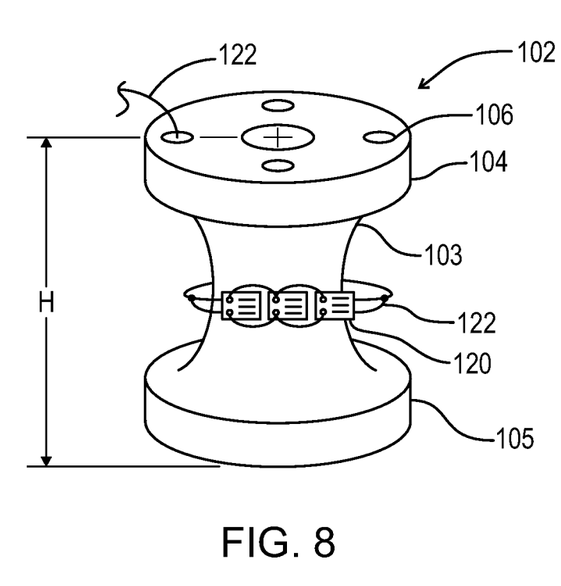
FIG. 8 is an isometric view of the deformable ring with wire strain gages wound around the ring.

Alternatively, as shown in FIG. 8, one or more strain sensing elements 120 (such as wire strain gages) of sufficient size and quantity are fastened (using conventional adhesives) to the vertical section 103 of the ring 102. The sensing elements 120 are centered on the vertical section 103 at mid-height and are aligned to measure hoop (circumferential) strains. The sensing elements 120 are fixedly bonded to the vertical section 103 using conventional adhesives such as epoxies or other suitable bonding agents.

Because these types of gages are discrete strain measuring devices; a sufficient number of strain gages 120 would be required for a given shear load. The number of strain gages 120 will depend on the level of accuracy desired for determining the direction of the resultant shear force vector and magnitude. For conventional electrical resistance-based strain gages, the resistance value and the length of the gage being used will increase sensor performance. The bolt shear force sensor 100 supplies a consistent strain regardless of the angular position (within a plane perpendicular to the longitudinal axis of the bolt or mechanical fastener 12) made by the shear force vector and the strain gages 120.

Figure 9:
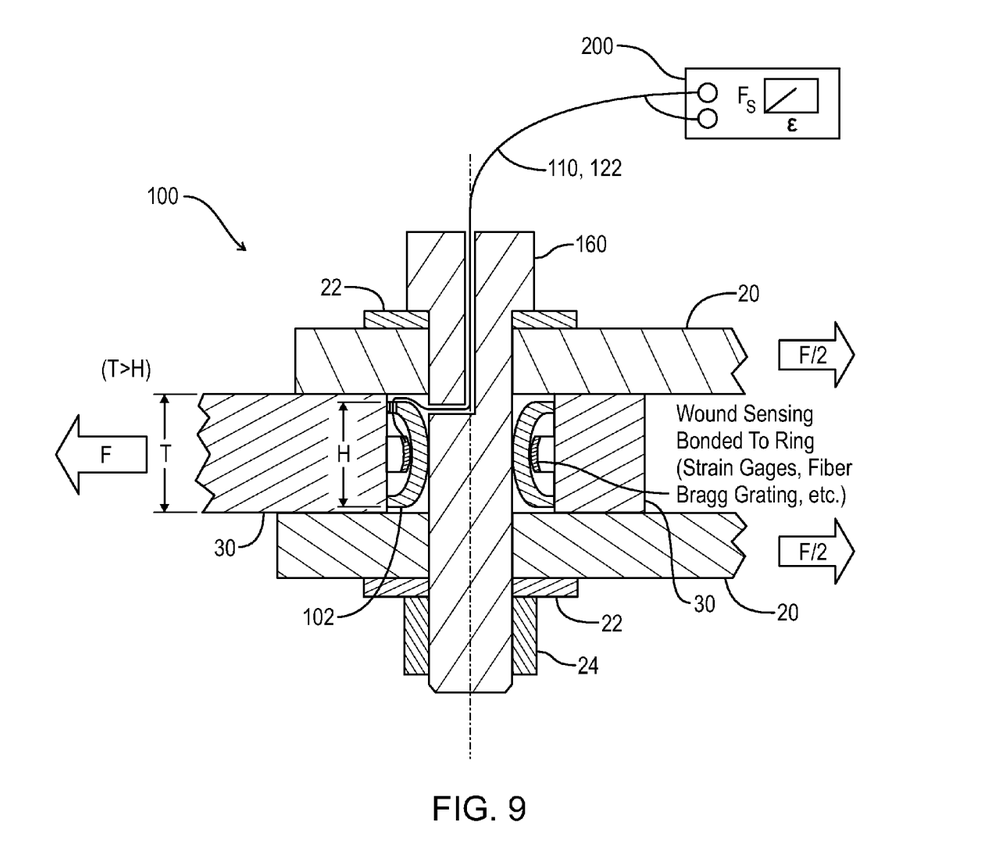
FIG. 9 depicts the bolt shear force sensor of the present invention having a wire conductor egress path thru a bolt.

Returning to FIG. 6, the signal conditioner 200 is operationally connected to the strain gages 120 via the optical fibers 110 or wire conductors 122 (shown in FIG. 9). A grooved adapter plate 40 provides a conduit for the optical fibers 110 and the wire conductors 122 from the aperture 106 to the signal conditioner 200. The signal conditioner 200 is used to convert the gage signals (i.e., change in resistance for the wire strain gages 120 and change in light frequency for Bragg strain gages of the optical fiber 110) to strain output.

The signal conditioner 200 may include a monitor that indicates a magnitude of resistance force ($F_S$) compared to a measured strain in the sensor ring (E). The strain outputs are then used in conjunction with a calibration curve of shear force versus strain to determine the magnitudes and directions of the resultant shear forces.

In the case of a sensor ring 102 made with piezoelectric ceramics, no strain gages are necessary since the ceramics produce a voltage as the ring deforms and becomes stressed. A wire conductor 120 would attach directly to the sensor ring 102 and would transmit voltages to the signal conditioner 200. In this case, the signal conditioner 200 converts the voltage readings to strain. Using the shear force versus strain calibration curve; shear forces are then calculated.

Sensitivity of the deformable ring 102 can be easily increased by incorporating additional strain sensing elements and/or through shape changes of the channel cross-section such as crowning or curving the vertical section 103. Crowning the vertical section 103 maximizes the bending moment and ensures that contact between the bolt 12 and the strain gages 120 (or the optical fiber 110) occurs at the vertical section rather than at the flanges 104, 105 to produce greater hoop strain and therefore increased sensitivity to ensure that the strain gages 120 are not subjected to strains along an axial direction of the bolt 12; the thickness of the strain gages must be less than the thicknesses of the plates that the strain gages are installed with.

For the double shear lap joint shown in FIG. 6 and FIG. 9; multiple fasteners can be used to clamp the plates together. In FIG. 9, the wire conductors 122 or the optical fibers 108 are placed into holes of a bolt 160 after which the plates 20 are stacked accordingly. The bolt 160 is placed into position by passing between the deformable rings 102 and the strain gages 120 or the optical fiber 110. The diameters of the flanges 104, 105 should be minimized as much as possible to allow an increased hole or aperture diameter in the plates 20 and mid-plate 30. Doing so will ensure that the presence of the bolt shear force sensor 100 does not adversely affect joint strength.

Once the joint is subjected to an external load (see force arrows "F" and "F/2"); any frictional resistance to slip is overcome and relative motions of the plates 20, 30 occur to the extent that a bolt bearing has developed. At this time, contact between the crown of the deformable ring 102 and the bolt 12 (or 160) occurs. The bolt 12 (or 160) is then locked in position and resists further plate motion. The bolt 12 (or 160) compresses the sensors or strain gages 106 against the middle plate 30 and the ring 102 deforms.

Similarly, contact between outer radial edges of the deformable ring 102 (180 degrees away from the contact developed at the crown) and the bolt hole surface occurs. Once these contact conditions are generated; a radial compressive force is produced in the bolt shear force sensor 100. This compressive force produces a measurable mechanical deformation (and strain) in the shear force sensor 100.

Depending upon the type of sensing elements used (i.e., resistance strain gages, fiber optic Bragg grating or piezoelectric material), an output is generated (i.e., resistance change, light frequency shift, or voltage) and is transmitted from the shear force sensor through either egress (aperture) shown in FIG. 6 and FIG. 9. The output is processed using the signal conditioner 200. Using calibration curves, the signal is converted to a shearing force and if sufficient sensing elements are incorporated within the shear force sensor 100, the vector of the shearing force is determined.

Figure 10:
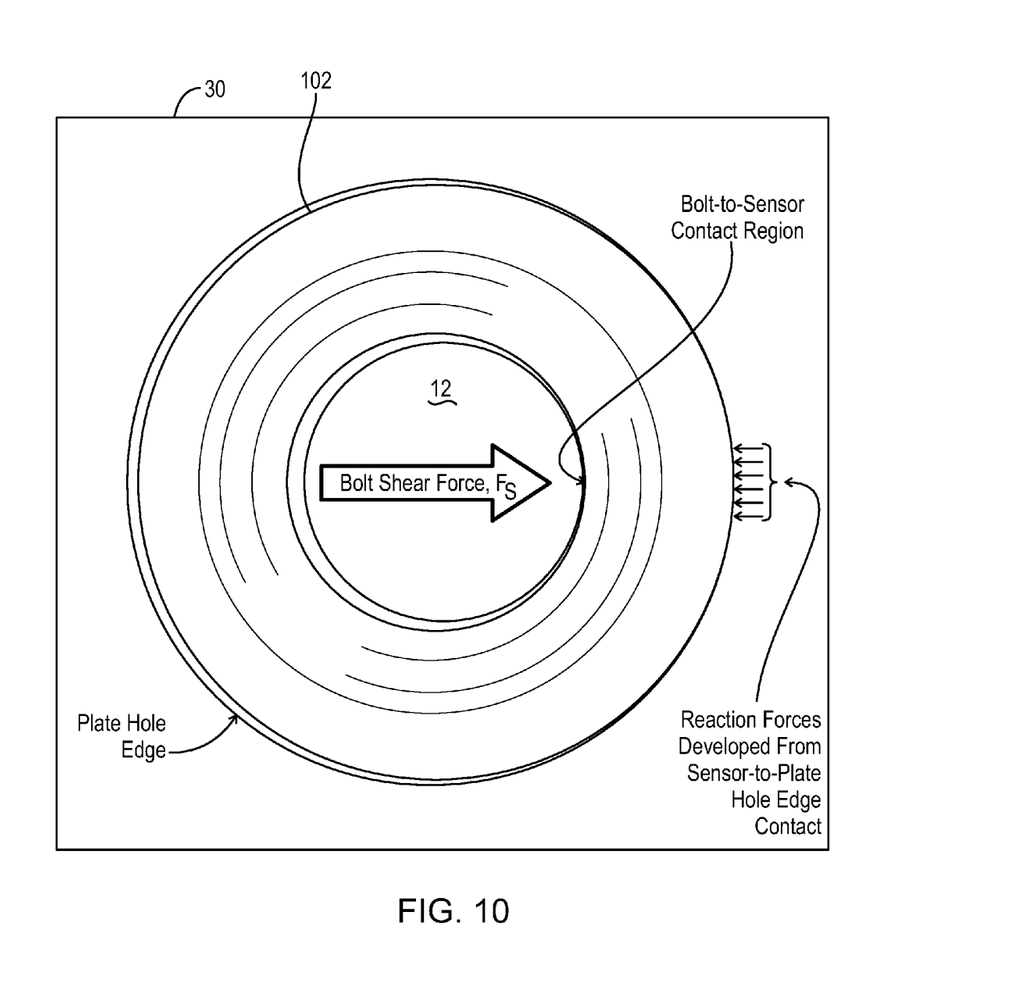
FIG. 10 depicts a shear force impacting a deformable ring of the shear force sensor of the present invention.
Figure 11:
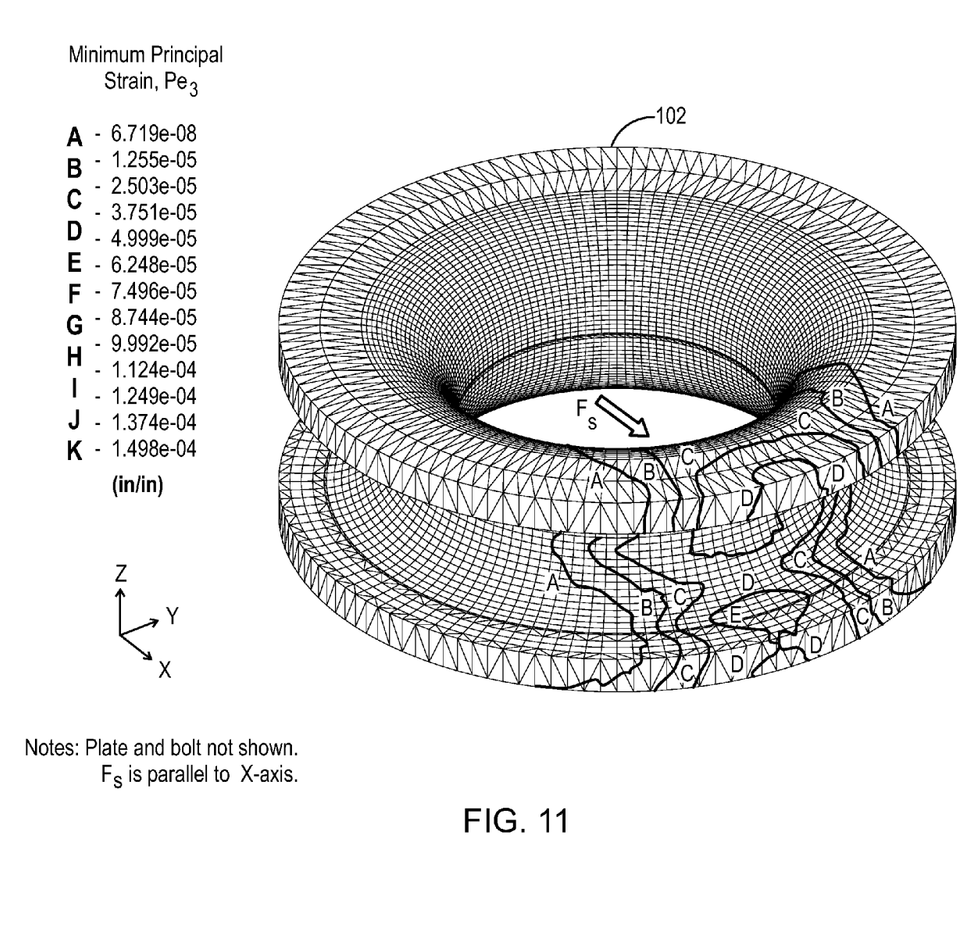
FIG. 11 depicts exterior strain areas on a deformable ring of the shear force sensor of the present invention.
Figure 12:
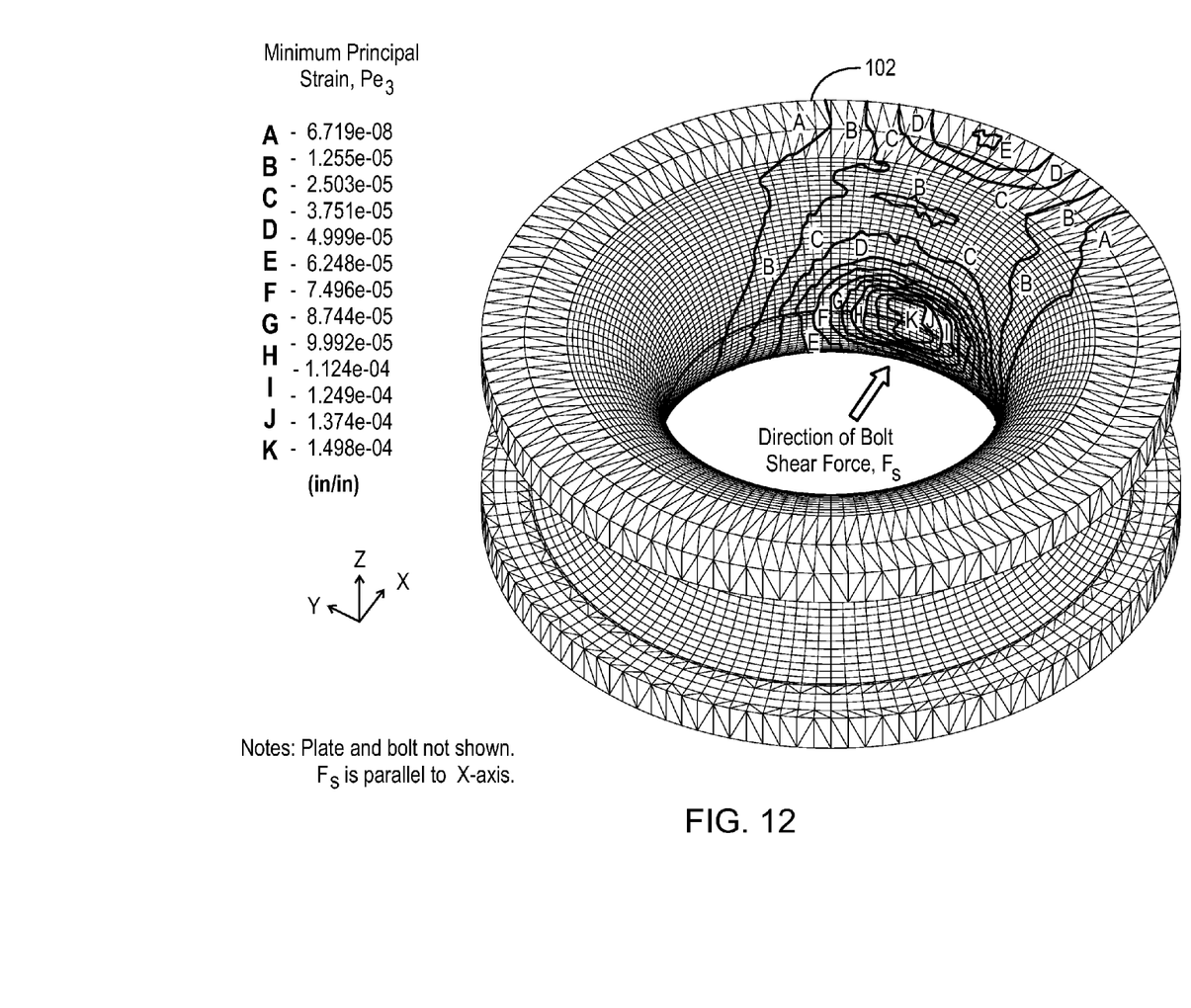
FIG. 12 depicts interior strain areas on a deformed ring of the shear force sensor of the present invention.

FIGS. 10-12 depict results of a modeling simulation that demonstrates the performance of the bolt shear force sensor 100. Referring to FIG. 10, the bolt 12 (or bolt 160) is fixed and a quasi-static horizontal displacement is applied to the plate 30. A reaction force occurs and is represented by the arrow designated as the bolt shear force vector, $F_s$.

FIG. 11 depicts exterior strain areas on the deformed ring 102 of the shear force sensor 100. FIG. 12 depicts interior strain areas on the deformed ring 102 of the shear force sensor 100. Real compressive principal strains are developed along the inner surface of the sensor at the vertical section 103 where direct contact occurs with the bolt 12 or 160 (See contour region "K" of FIG. 12). Strain values decrease as points of interest become further away from region K.

The present invention provides continuous and real-time monitoring of shear forces in fasteners used in mechanical joints. The present invention is particularly useful in joints containing multiple fasteners in which the distribution of fastener shear forces may be complicated (see the example of FIG. 13) or cannot be determined.

Figure 13:
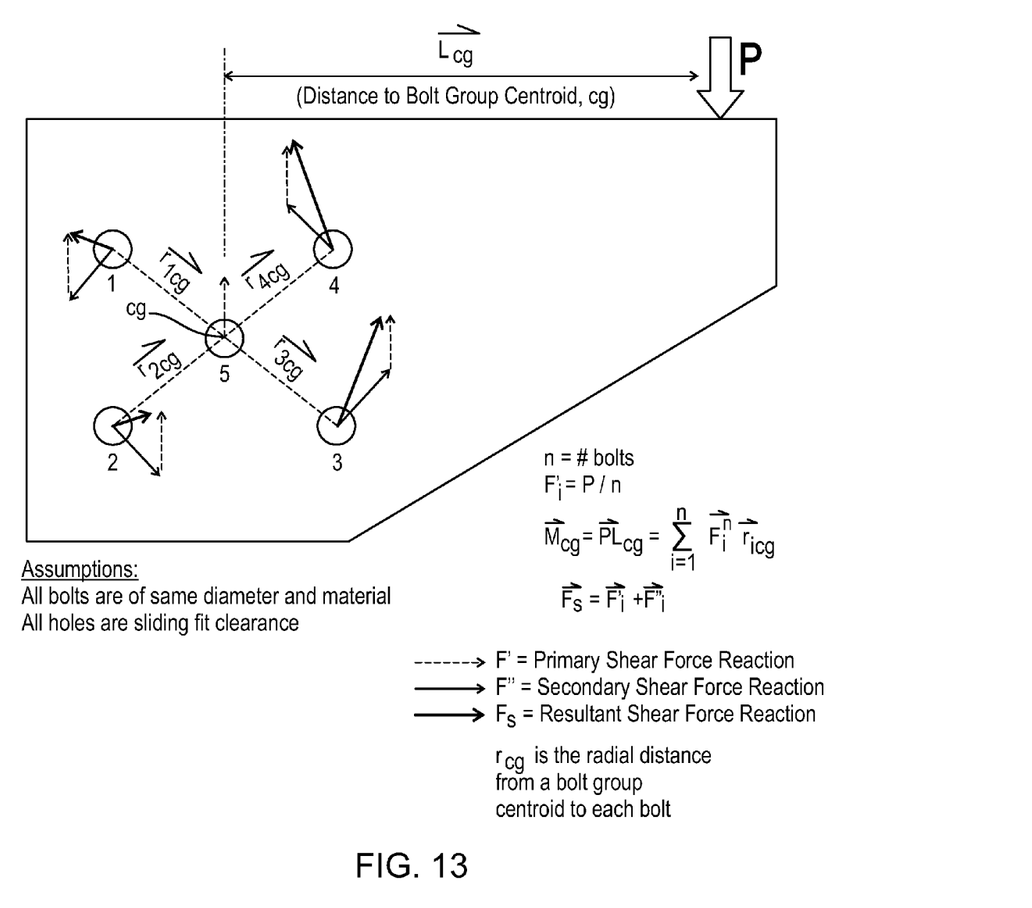
FIG. 13 depicts shear force reactions in a multi-fastener, eccentrically loaded bolted connection.

The example of FIG. 13 demonstrates the applied loading vector P and shear force vectors $F'_i$ and $F''_i$ and resultant shear force vector $F_s$ for a ith bolt. The equations shown are used to perform the vector analysis calculations that are used to compute the magnitude of the resultant shear force vector for each bolt. $F'_i$ is the direct shear force reaction for the bolt i. $F''_i$ is the rotational shear force reaction for the bolt i. The sum of all $F_i \times r_{icg}$ is the total reaction moment of the joint for which a static equilibrium must equal $P \times L_{cg}$ (See Mechanical Engineering Design, J. E. Shigley, $3^{rd}$ ed. pp. 256-263, 1977).

Returning to the prior art for a comparison of results, the Shah reference senses localized fastener deformations that occur along a longitudinal axis of a fastener. Alternatively, the present invention senses bolt bearing deformations by using a separate, deformable ring positioned externally to the fastener. The fiber optic sensing elements of the Shah reference capture an axial, total transverse and torsional strains as measured from localized deformation of drilled hole regions of the fastener. However, the cited reference cannot distinguish directly between transverse compression strains due to Poisson's effect and bolt bearing strains.

Consider a fastener loaded in pure axial tension as shown in FIG. 2. By Poisson's effect, a compressive strain would develop along an axis transverse to the longitudinal axis of the fastener. Now, consider the combined presence of Poisson's strains from bolt tension and transverse strains from a bolting bearing as shown in FIG. 5. The Shah reference senses the sum of these transverse strains rather than the individual strain components. The cited reference, through the use of signal processing, must separate the Poisson's effect transverse strains (i.e., the transverse compressive strains resulting from axial tensile loads in the fastener) from the transverse bolt bearing strains. This is an indirect approach of measurement.

The bolt shear sensor 100 of the present invention describes a direct approach and is not sensitive to fastener axial loads and the transverse strains resulting from the Poisson's effect. Furthermore, the invention describes sensing ring geometry to have a thickness "H" that is slightly less than the plate thickness "T" such that the deformable ring vertically "floats" in the hole of the plate (See FIGS. 6 and 9). Therefore, the sensing ring 102 is not subject to through-thickness compressive joint forces and hence the transverse strains from the Poisson's effect.

Furthermore, the Shah reference requires drilling a hole through along a longitudinal axis of the fastener. This drilling decreases the axial, bending, torsional and direct shear strengths and stiffnesses of the fastener. The bolt shear force sensor of the present invention optionally discloses a similar technique used solely for enabling the egress of conductive wires from the ring sensor through one partially-drilled lateral hole and one partially drilled central hole in the fastener. Both the reference and the present invention have the potential to degrade bolt strength and stiffness but through holes provide significantly greater degradation.

Alternatively, the present invention also provides an egress method that avoids having to drill any holes in the fastener by using an adaptor plate with a wire conductor egress. This latter option preserves a complete range of strengths and stiffnesses of the fastener with no degradation.

The deformable ring 102 of the bolt shear force sensor 100 of the present invention can be made of conventional and non-conventional structural materials. The sensors can be instrumental with one or more wire strain gages, one or more Bragg gratings for fiber optic strain gages or piezo-electric materials, etc.

For optical strain gages that utilize Bragg gratings; a single optical fiber containing multiple, closely spaced Bragg gratings would be desirable to provide sufficient resolution and sensitivity. The cross section of the bolt force sensor 100 is not restricted to the channel configuration described herein; other strain sensitive geometries could be used but would require an axisymmetric (ring-like) shape.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. A shear force sensor for in-service monitoring of a fastener, said sensor comprising:
  a ring surrounding the fastener, said ring having a circumference formed as a channel extending from an interior of the circumference in which a base of the channel has a diameter less than a diameter of ends of first and second flanges of the channel extending from the base with an aperture extending thru the first flange;
  an optical fiber having at least one optical strain gage for capturing hoop strain in said ring and for transmitting signals thru the aperture to a signal conditioner based on the hoop strain with said at least one optical strain gage positioned around the circumference of said ring on a side of the circumference opposite the center of said ring; and
  a grooved adapter plate sized to allow passage of said optical fiber from the aperture of said ring;
  wherein strain outputs by the signal conditioner are usable in conjunction with a calibration curve of shear force versus strain to determine magnitudes and directions of shear forces based on hoop strains in said ring.

2. A system for in-service monitoring of a fastener, said system comprising:
  a ring surrounding the fastener, said ring having a circumference formed as a channel extending from an interior of the circumference in which a base of the channel has a diameter less than a diameter of ends of first and second flanges of the channel extending from the base with an aperture extending thru the first flange;
  an optical fiber with at least one optical strain gage for capturing hoop strain in said ring and transmitting the hoop strain as signals, said at least one optical strain gage positioned around the circumference of said ring on a side of the circumference exterior to the center of said ring;
  a grooved adapter plate sized to allow passage of said optical fiber from the aperture; and
  a signal conditioner operationally connected via said grooved adapter plate to said optical fiber wherein said signal conditioning unit is for converting the signals to strain outputs that are usable with a calibration curve to determine magnitudes and directions of shear forces based on hoop strains in said ring.

3. A system for in-service monitoring of shear stress, said system comprising:
  a bolt including a conduit extending from a first end at a head of said bolt to a second end at a circumference of a shank portion of said bolt;
  a ring surrounding said bolt, said ring having a circumference formed as a channel extending from an interior of the circumference in which a base of the channel has a diameter less than a diameter of ends of first and second flanges of the channel extending from the base;
  an optical fiber having at least one optical strain gage for capturing hoop strain in said ring and transmitting signals based on the hoop strain, said at least one optical strain gage positioned at the circumference of said ring on a side of the circumference exterior to the center of said ring; and
  a signal conditioner operationally connected via said bolt to said optical fiber for converting the signals from said at least one optical strain gage to strain outputs that are usable with a calibration curve to determine magnitudes and directions of shear forces on said ring.

* * * * *